United States Patent

[11] 3,573,787

[72] Inventors George E. Sandgren
Glenview;
William Milleker, Chicago, Ill.

[21] Appl. No. 701,940
[22] Filed Jan. 31, 1968
[45] Patented Apr. 6, 1971
[73] Assignee Motorola, Inc.
Franklin Park, Ill.

[54] GENERATOR FOR VIDEO SIGNAL FOR REPRODUCTION OF CHARACTERS BY TELEVISION RECEIVER
10 Claims, 4 Drawing Figs.

[52] U.S. Cl. .......... 340/324, 340/347
[51] Int. Cl. .......... G06f 3/14, G06k 15/18, G08c 19/28
[50] Field of Search .......... 340/324.1, 347; 178/6.8, (Inquired)

[56] References Cited

UNITED STATES PATENTS

| | | | |
|---|---|---|---|
| 3,345,458 | 10/1967 | Cole et al. .......... | 340/324.1 |
| 3,388,391 | 6/1968 | Clark .......... | 340/324.1 |
| 3,439,219 | 4/1969 | Greenblum .......... | 340/324.1 |
| 3,444,319 | 5/1969 | Artzt et al. .......... | 340/324 |
| 3,011,153 | 11/1961 | Haselton et al. .......... | 340/154 |

*Primary Examiner*—Donald J. Yusko
*Assistant Examiner*—Marshall M. Curtis
*Attorney*—Mueller and Aichele

ABSTRACT: Character generator for developing a video signal for application to a television receiver to reproduce characters on the tube screen by a dot matrix. The signal representing each character actuates a plurality of gates for horizontal lines which are operated in turn, and each selectively triggers a set of gates associated with the dot positions along the lines which are operated in turn to produce video components which are combined to form the video signal.

INVENTORS
GEORGE E. SANDGREN
WILLIAM MILLEKER
BY
Mueller, Aichele & Rauner
ATTYS.

PATENTED APR 6 1971 3,573,787

SHEET 2 OF 2

INVENTORS
GEORGE E. SANDGREN
WILLIAM MILLEKER

BY Mueller, Aichele & R...
ATTYS.

GENERATOR FOR VIDEO SIGNAL FOR REPRODUCTION OF CHARACTERS BY TELEVISION RECEIVER

BACKGROUND OF THE INVENTION

There are many applications in which it is desired to display information such as words, letters, numbers or other characters on a television receiver or monitor. For such applications it is desired to be able to display information which may be continuously read out from a memory, or provided from some other signal supply. Systems have been constructed for such use but have been too complex and expensive for use in many applications.

One application for a simple character generating system is in hospitals where it is desired to display at various points information indicating the presence of different doctors in the hospital, and other information such as the availability of the various beds in the hospital. There are many other applications for such a system as to indicate the time of arrival and departure of airplanes, stock market quotations, etc.

BRIEF SUMMARY OF THE INVENTION

It is an object of the present invention to provide a simple and inexpensive system for developing a video signal for the reproduction of characters by a television receiver.

A further object is to provide a video signal generator for the display of characters as a dot matrix wherein character signals control gates for providing video components representing dots in various predetermined positions in a plurality of lines to represent letters, numerals and/or other characters.

The character generator of the invention may receive code signals representing characters from a memory or other signal source. The system includes detectors for providing outputs at a plurality of terminals individually associated with the characters. A plurality of two-input gates are connected to each terminal and to the outputs of a counter which causes the gates to be actuated in turn to apply signals to a plurality of NOR gates. Each of the NOR gates actuates a memory element providing a signal to a two-input gate in a second series, with such gates being actuated in turn by signals from a second counter. The outputs of the second series of two-input gates are applied to an output NOR gate. The second series of two-input gates are actuated in rapid succession to produce video components representing dots following in succession along a line. The first set of two-input gates are actuated at a greater interval to provide signals for successive lines across the screen of the receiver tube. For displaying characters by a matrix having a width of $N$ dots and a height of $M$ rows of dots, the system requires $M$ two-input gates for each character, and $N$ two-input gates in the second series which are actuated for all the characters and provide the video components producing dots across the width of the matrix forming $N$ columns for each character.

DESCRIPTION OF THE PREFERRED EMBODIMENT

Figure 1:
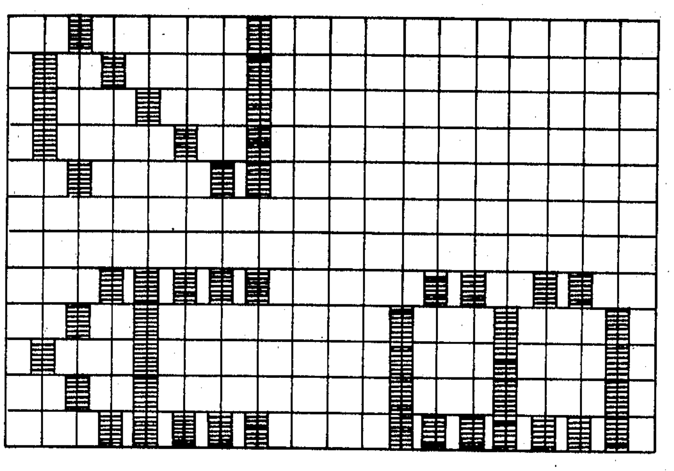
FIG. 1 illustrates the form of the characters displayed.

The system of the invention provides a video signal which can be applied to a standard television receiver for displaying characters on the screen of the cathode ray tube thereof. The characters are shown by a dot matrix which may be five dots wide and seven dots high, for example. It will be obvious that a matrix having different dimensions can be used. FIG. 1 illustrates the letters A and B and the numeral 2 as displayed on the cathode ray tube screen. Two spaces may be provided between adjacent characters on a line to separate the same, and three spaces may be provided between adjacent lines. The letter B is shown in the second line.

Figure 2:
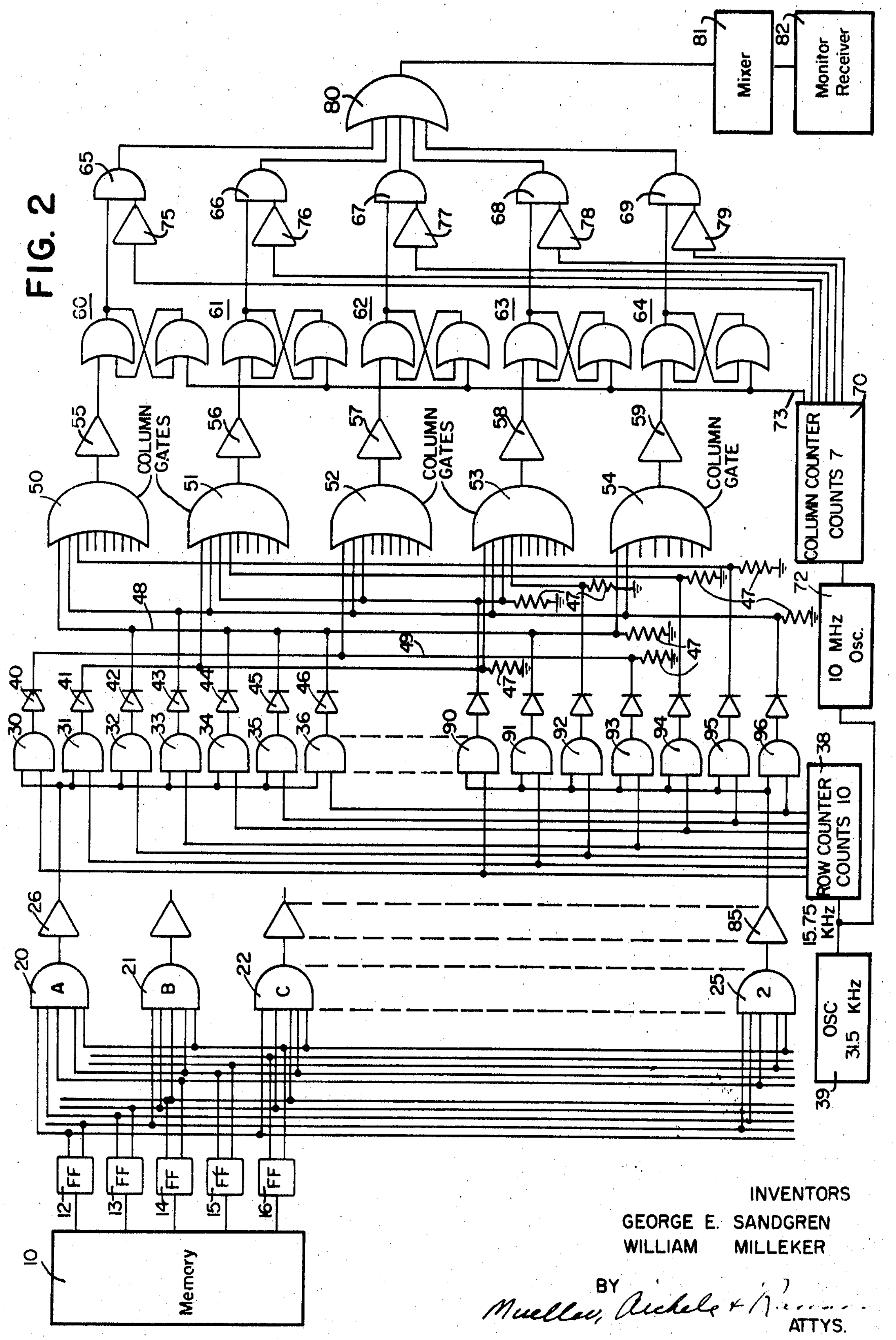
FIG. 2 is a block diagram of the system of the invention.

The signals representing the characters to be displayed by the television receiver may be derived from any source such as from a memory in which the information to be displayed is stored. In the system shown in FIG. 2, the memory 10 may be of any type which stores information and reads out in sequence signals representing the characters to be displayed. In the system illustrated the memory 10 stores a 5-bit code and has five outputs individually connected to flip-flop circuits 12 to 16 inclusive. The memory must read out the signals in the order in which the characters are to be displayed. The flip-flop circuits 12 to 16 each have two outputs which are selectively energized depending upon whether or not a signal is applied thereto from the memory.

Figure 3:
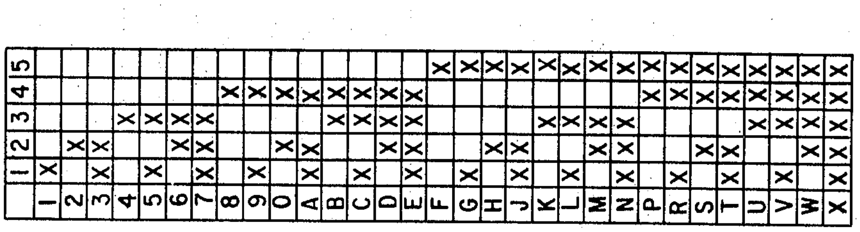
FIG. 3 shows a signal code which may be used for the different characters.

A plurality of character detectors 20, 21, 22 and 25 are connected to the outputs of the flip-flop circuits and are selectively connected to one output of each flip-flop circuit so that each detector produces a signal at its output as the memory reads out the code representing the associated character. The character detectors are five input NAND gates and respond when all five inputs are energized. Detectors 20, 21 and 22 are connected to respond to the codes representing the letters A, B and C, respectively, and detector 25 responds to the code representing numeral 2. FIG. 3 illustrates the codes which are used in the system, described as an example.

The detector 20 is connected through inverter 26 to a plurality (seven) of two input NAND gates 30, 31, 32, 33, 34, 35 and 36. Seven gates are required as the characters are formed by a matrix seven lines or rows high. When the code representing the letter A is read out by the memory 10, detector 20 applies a signal through inverter 26 to one input of each of the gates 30 to 36. A second input is applied to each of the seven gates from the row counter 38, which is synchronized by oscillator 39. The counter 38 provides 10 counts for each operation, with seven counts forming the seven lines or rows in the character and three counts providing the space between successive lines. That is, the counter will apply a signal to the gate 30 to actuate the same during the first row, to the gate 31 during the second row, and so forth.

The outputs of the gates 30 to 36 are individually applied through isolating diodes (OR gates) 40 to 46, respectively, across resistors 47 to five multi-input NOR gates 50, 51, 52, 53 and 54. The resistors 47 connected from the diodes 40 to 46 to ground provide direct current restoration of the signals. The gates 50 to 54 are associated with the five dot positions or columns across each character, with gate 50 being associated with the first dot position, gate 51 being associated with the second dot position, etc. The gates 50 to 54 are selectively connected to the outputs of gates 30 to 36 associated with each line in accordance with the position of dots in such line for the character involved. Referring to FIG. 1 and considering the letter A, it will be noted that the first line or row has a single dot in the third or center position (column) of the letter. The connection from gate 30 through diode 40 to the first input of gate 52 provides a video signal component which produces a dot in the center position of the matrix. In the second line of the letter A, two dots are required in the second and fourth positions. Accordingly, the gate 31 is connected through diode 41 to the first input of gate 51 associated with the second position, and to the first input of gate 53 associated with the fourth position. The other connections are made from gates 32 to 36 to the gates 50 to 54 to provide the dots as illustrated in FIG. 1.

Figure 4:
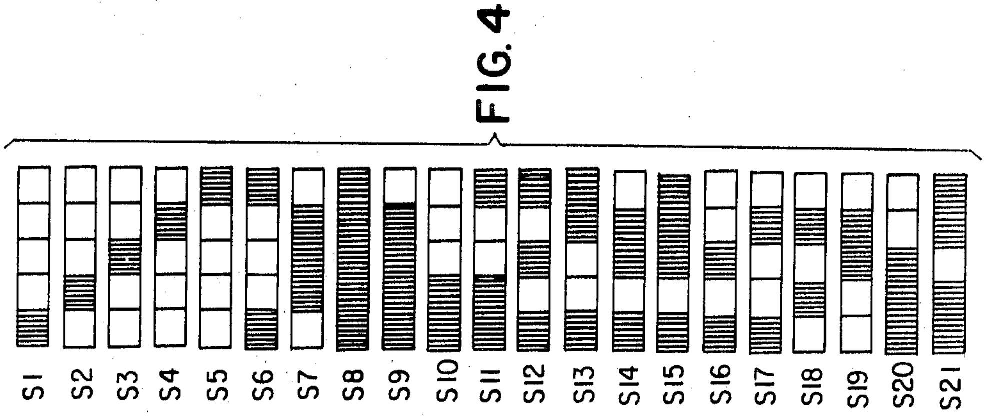
FIG. 4 illustrates the different line segments used to make up the characters.

FIG. 4 shows the different line segments used in the 5 by 7 matrix to form the different characters. Seven of these segments are used for each character, with the same segments being used for different characters, and being repeated in the same character. Considering the letter A again, the first (top) line is formed by segment S3, the second line by S18, the third line by S6, the fourth line by S8 and the fifth, sixth and seventh lines all use S6 again. The gates 32, 34, 35 and 36 for the third, fifth, sixth and seventh line segments of the character A are therefore all connected to the same conductor 48 representing segment S6, which is connected to the NOR gates 50 and 54. The diodes 42, 44, 45 and 46 isolate the gates 32, 34, 35 and 36, respectively.

The numeral 2 uses for the second line the segment S6, and for the fourth line the segment S3, both of which were used in the letter A. The gate 91 is, therefore, also connected to the conductor 48 which represents the segment S6. The gate 93 for the fourth line segment of the numeral 2 is connected to the same conductor 49, representing segment S3, which is connected to gate 30 for the first line of the character A. This actuates NOR gate 52 in the third position to provide a dot in the center of the line segment. It will be apparent that the NAND gates which control any one line segment are connected to the same conductor for providing signals to the NOR gates which produce dots in the required positions for such line segment.

The outputs of the gates 50 to 54 are applied through inverters 55 to 59 to five flip-flop circuits 60 to 64, respectively. Signals applied from the gates 50 to 54 will set the flip-flop circuits 60 to 64 to apply a signal therefrom to the five gates 65 to 69, respectively. These latter are two input NAND gates with signals applied to the second input thereof from the column counter 70 through inverters 75 to 79 respectively. The column counter 70 is triggered by oscillator 72 which is in turn synchronized by the oscillator 39. The column counter provides a count of seven and operates at a substantially higher repetition rate than the counter 38. The counter 70 has an output 73 connected to all the flip-flops 60 to 64 to reset the same, and five outputs individually connected through the inverters 75 to 79 to the gates 65 to 69. Accordingly, the five flip-flops form a memory to retain the dot information from gates 50 to 54 until the gates 65 to 69 are all actuated in turn by the signals applied thereto through the inverters 75 to 79. The outputs of gates 65 to 69 form the video components of the output signal. The flip-flops 60 to 64 are then reset by the signal from output 73 of counter 70 so that they are in condition to register the dot positions of the next character.

The outputs from the gates 65 to 69 are applied to the five input gate 80 which combines the video signal components to form the output video signal. Components for several characters in a line are provided in sequence and the components must have a repetition rate to provide the components in a line during a single count of counter 38. The pulses produced by column counter 70 must have a repetition rate at least 40 times the repetition rate of pulses produced by row counter 38. The video signal is applied to a mixer 81 which adds synchronizing and/or blanking signals as required to actuate the television or monitor receiver 82. A plurality of receivers may be provided to display the characters at a plurality of locations.

The detectors 21, 22 and 25 for the letters B and C and numeral 2, respectively, each applies signals to seven two-input gates, which may be like the gates 30 to 36 connected to detector 20. These will have inputs coupled to counter 38 and outputs coupled to the multi-input NOR gates 50 to 54, in the manner previously described. The gates associated with detectors 21 and 22 are not shown. Gates 90 to 96 are coupled to detector 25 through inverter 85, and have inputs to which pulses from horizontal scanning counter 38 are also applied. The outputs of gates 90 to 96 are coupled through isolating diodes to the multi-input NOR gates 50 to 54 to provide the dots in the respective lines for the numeral 2, as shown in FIG. 1. The seven gates coupled to the detector for each character all have outputs connected to the NOR gates 50 to 54. These NOR gates will therefore have more inputs than are shown in the drawing.

Additional detectors may be provided so that any desired number of characters can be displayed. These may include letters and numbers, as illustrated in FIG. 1, and any other character which might be formed by a dot matrix. In the system which has been illustrated a total of 31 detectors is provided so that 10 numerals and 21 letters can be displayed. The codes for these characters are shown in FIG. 3. The segments S1 to S21 shown in FIG. 4 form all the lines required to make up the 31 characters. If different characters are to be displayed, it may be necessary to use different segments.

The various gates and flip-flop circuits illustrated in the system of FIG. 1, can be known standard forms. These may include semiconductor devices, and can be provided on printed circuit boards to facilitate construction and provide a compact structure. As many of the components used are repeated for the different characters, and for different dots across the matrix, it is possible to use a number of boards which are identical to each other to provide a significant cost saving. The circuits can be provided in integrated circuit form to further reduce the cost and the size.

In the operation of the system, the memory will read out the code for the characters in the first line to be displayed on the screen at a frequency coordinated with the frequency of the column counter 70, so that the first line of dots will be displayed on the screen. The same line of characters will be read out seven times at a repetition rate corresponding to the repetition rate of the row counter 38 so that the seven lines for each character will be displayed. This operation will continue for the various lines of characters. The standard television receiver utilizes interlace scanning wherein the horizontal lines for successive fields are interspersed vertically. This will fill in the vertical spaces between dots so that the characters will be shown by continuous lines.

The memory will continuously read out information therein. When the information in the memory is changed, the new information will be read out so that the characters displayed will change. Various arrangements are known for providing information in a memory and reading the same out which can be used to supply signals to the character generator described. As previously stated, information can be supplied by any signal source.

The character generator described has been found to provide satisfactory operation when used with a television receiver or monitor to display letters, numbers and the like. The equipment received is simpler and less expensive than in prior generators. It is pointed out that the various known gate devices can be used in the system described and these are available in integrated form so that a highly reliable generator can be provided in compact form.

We claim:

1. A system for generating a video signal for application to a television receiver to display characters on the cathode ray tube thereof in the form of a matrix having a width of $N$ dots and a height of $M$ rows of dots, such systems including in combination, input means having a plurality of terminals providing in sequence signals representing particular characters, $M$ first gates associated with each character and each having first and second inputs with said first input coupled to the one of said terminals for such character for receiving the signals therefrom, first counter means having $N$ outputs individually connected to said second inputs of said first gates for all the characters and applying pulse signals thereto for rendering said first gates conducting in turn, $N$ second gates having a plurality of inputs and providing an output in response to a signal at any one of said inputs, means connecting said outputs of said first gates for each character to said inputs of predetermined ones of said second gates to produce signals representing the dots of the individual rows forming such character, $N$ third gates each having first and second inputs with said first input coupled respectively to the output of one of said second gates, fourth gate means having $N$ inputs connected to the outputs of said third gates, and second counter means having $N$ outputs connected individually to said second inputs of said third gates and applying pulse signals thereto for rendering said third gates conductive in turn to apply signals to said fourth gate means, said second counter means providing pulses at a repetition rate at least 40 times the repetition rate of said first counter means so that said fourth gate means applies a video signals forming dots in a line as said third gates are rendered conducting, and said first gates provide signals in turn to said second gates for controlling the video signal for successive lines.

2. A system in accordance with claim 1 wherein said input means includes a detector for each character, and each of said detectors has an input for receiving a coded signal and an output connected to said terminal of said input means associated with the particular character.

3. A system in accordance with claim 2 including inverter means connected between each detector of said input means and the associated terminal thereof.

4. A system in accordance with claim 1 including memory means connected between the outputs of said second gates and the inputs of said third gates, and means connecting said second counter to said memory means for resetting the same.

5. A system in accordance with claim 4 wherein said memory means includes a flip-flop circuit connected between the output of each second gate and one input of the respective third gate, and means connecting said second counter to said flip-flop circuits for resetting the same.

6. A system in accordance with claim 1 wherein said first gates and NAND gates, said second gates are NOR gates, said third gates are NAND gates and said fourth gate means is a NOR gate.

7. A system in accordance with claim 6 including an inverter connecting the output of each second gate to one input of the respective third gate.

8. A system in accordance with claim 6 including an inverter connected to the output of each second gate, a flip-flop circuit connecting each of said inverters to one input of the respective third gate, and means connecting said second counter to each of said flip-flop circuits for resetting the same.

9. A system for generating a video signal for application to a television receiver to display characters on the cathode ray tube thereof in the form of line segments having *N* dot positions along the line and a height of *M* line segments, and with each line segment having dots in particular positions, such system including in combination, input means having a plurality of terminals providing signals representing particular characters, *M* first gates connected to each terminal with said gates being individually associated with the *M* line segments for the character represented by such terminal, counter means connected to said *M* first gates for each character and applying signals thereto for rendering said first gates operative in turn, *N* second gates representing the *N* dot positions in a line segment and having a plurality of inputs and providing an output in response to a signal at any one of said inputs, a plurality of circuit means each connected to said inputs of predetermined ones of said second gates which represent the dot positions for a particular line segment, means connecting the output of each of said first gates to one of said circuit means to actuate said second gates for the particular line segment, *N* third gates coupled respectively to the outputs of said second gates, and counter means connected to said third gates and applying signals thereto for rendering said third gates operative in turn to provide signals for producing dots in sequence in positions for a particular line segment.

10. A system in accordance with claim 9 wherein said first gates are rendered operative at a relatively slow rate so that said third gates provide signals for a plurality of line segments between successive operations of said first gates.